Oct. 10, 1933.  H. BROWN  1,929,804
TRACTOR
Original Filed Dec. 22, 1930   7 Sheets-Sheet 1
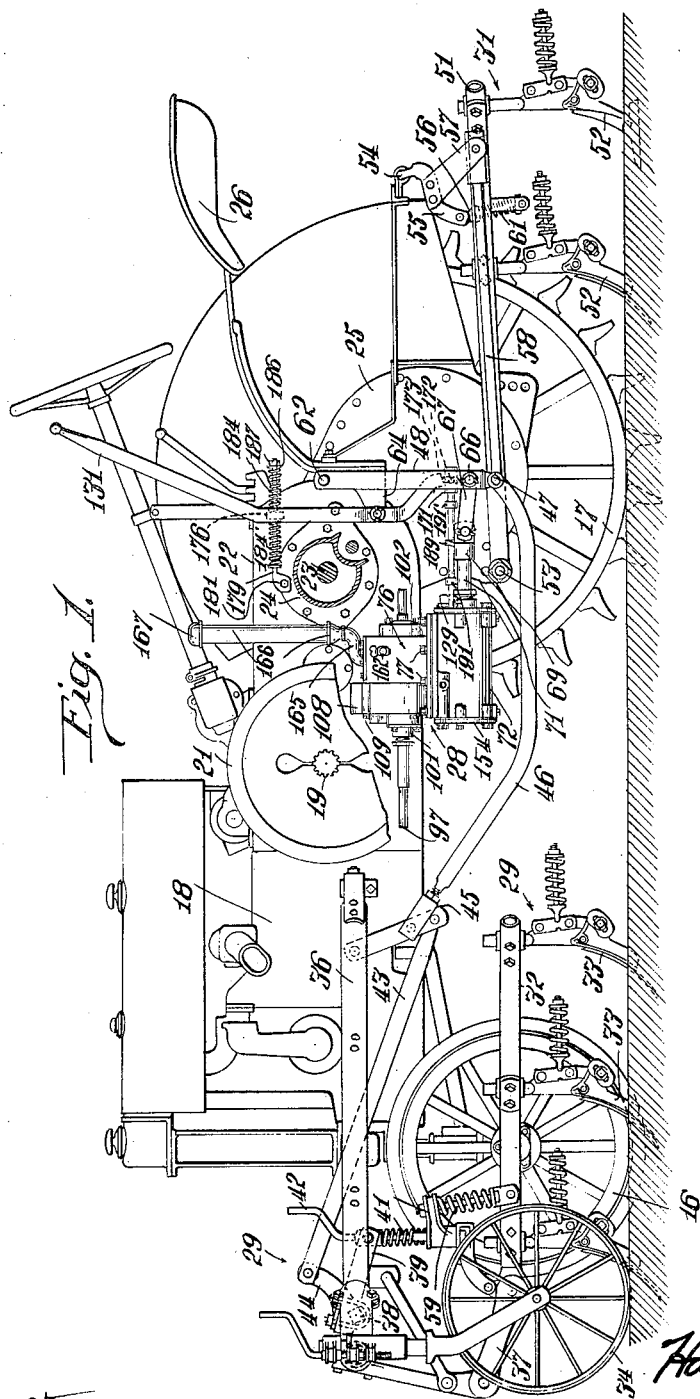
Inventor.
Harold Brown
Witness
Milton Lenoir  By Brown, Jackson, Boettcher & Drenner
Attorneys.

Oct. 10, 1933.    H. BROWN    1,929,804
TRACTOR
Original Filed Dec. 22, 1930    7 Sheets-Sheet 2
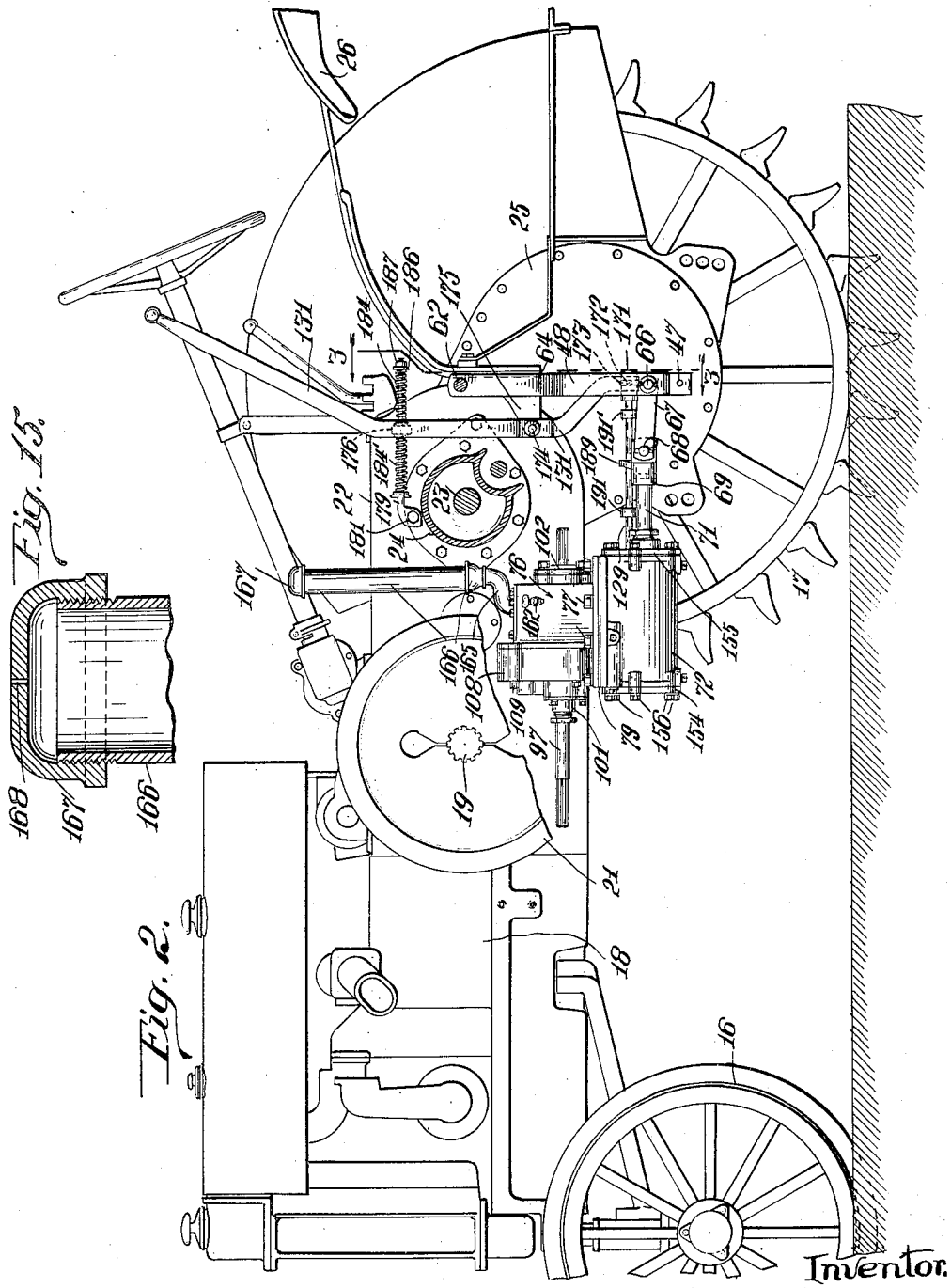
Witness
Milton Lenoir
Inventor.
Harold Brown
By Brown, Jackson, Boettcher & Drennen
Attorneys.

Oct. 10, 1933.   H. BROWN   1,929,804
TRACTOR
Original Filed Dec. 22, 1930   7 Sheets-Sheet 3
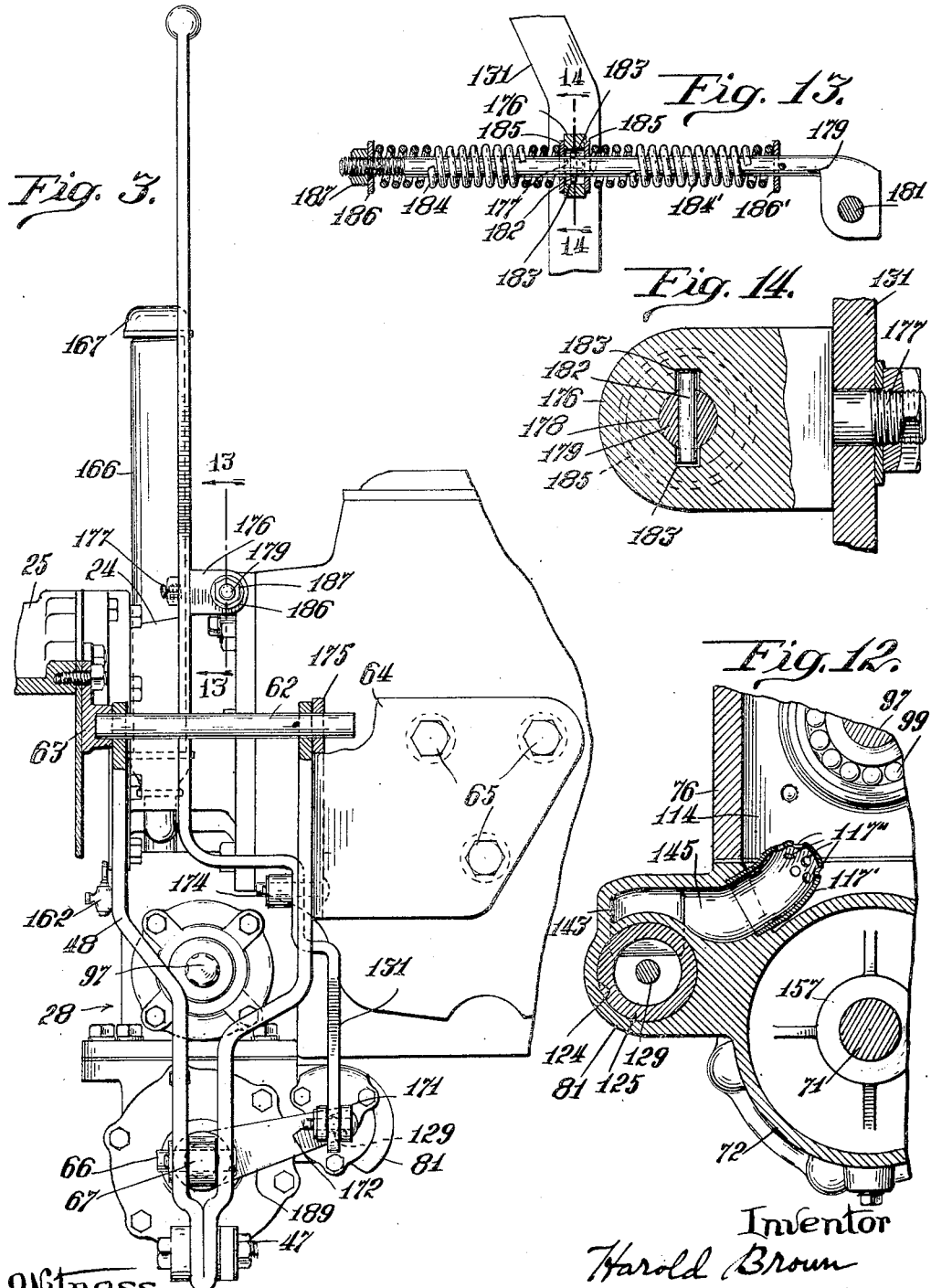

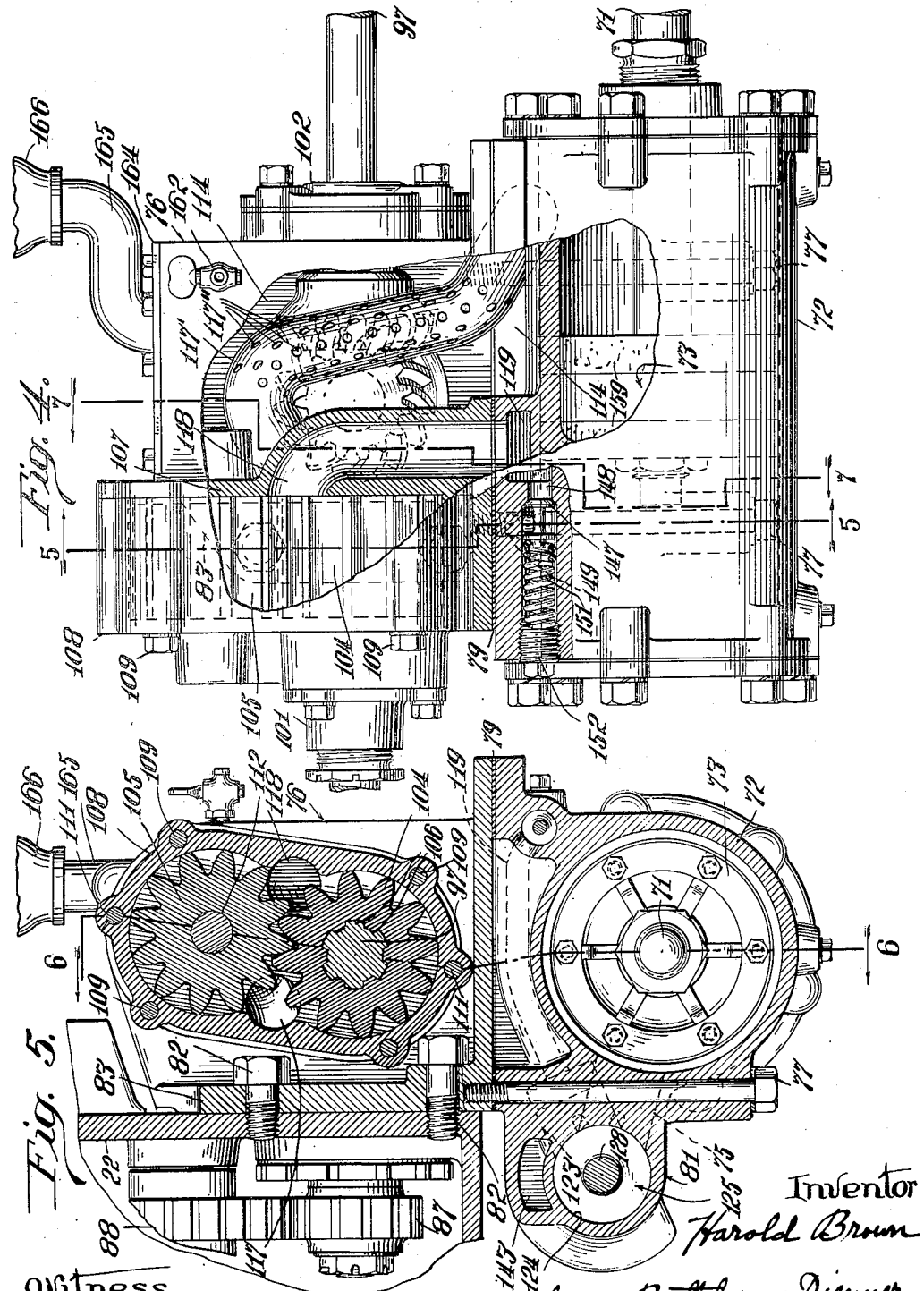

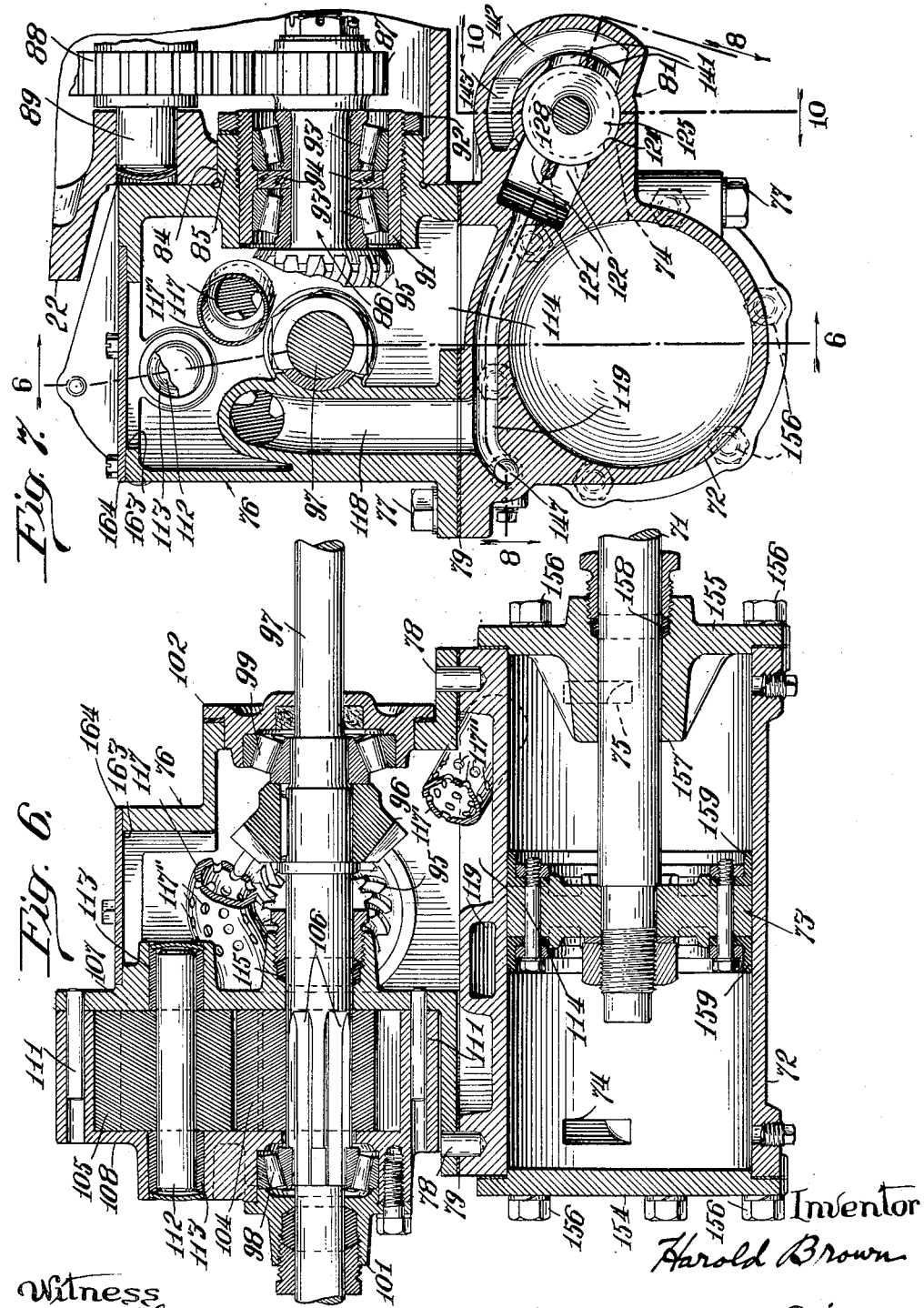

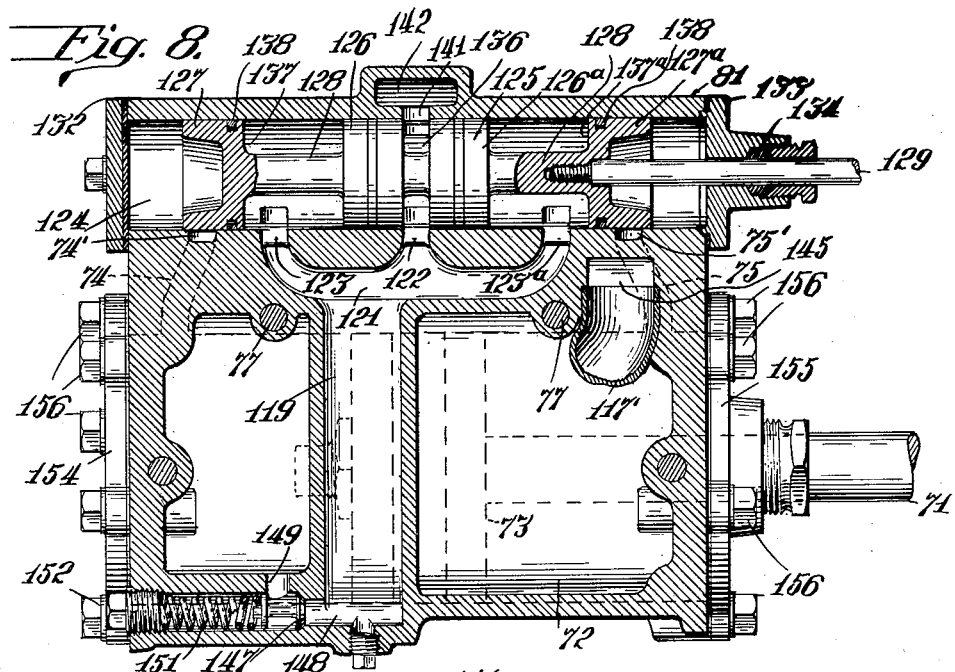
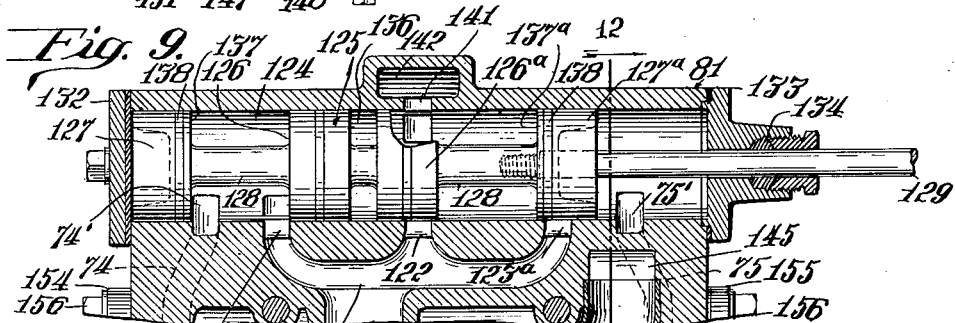
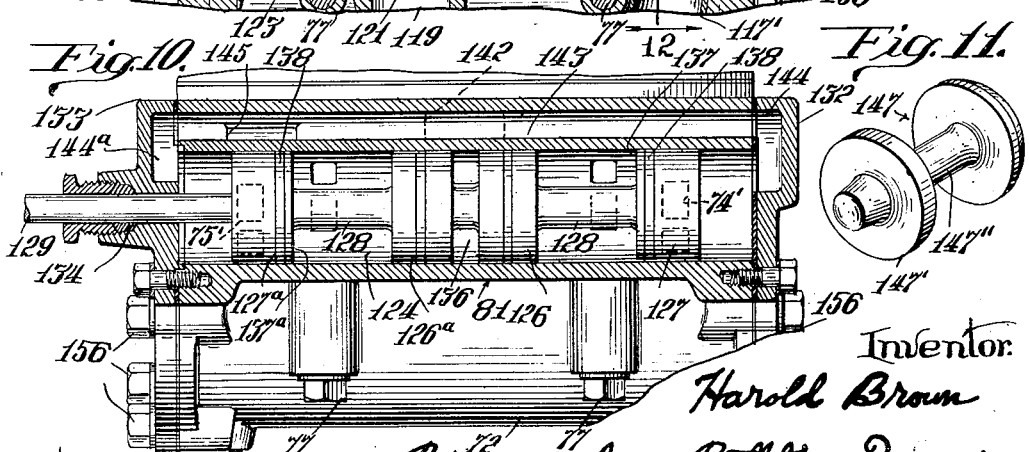

Oct. 10, 1933.  H. BROWN  1,929,804
TRACTOR
Original Filed Dec. 22, 1930   7 Sheets-Sheet 7
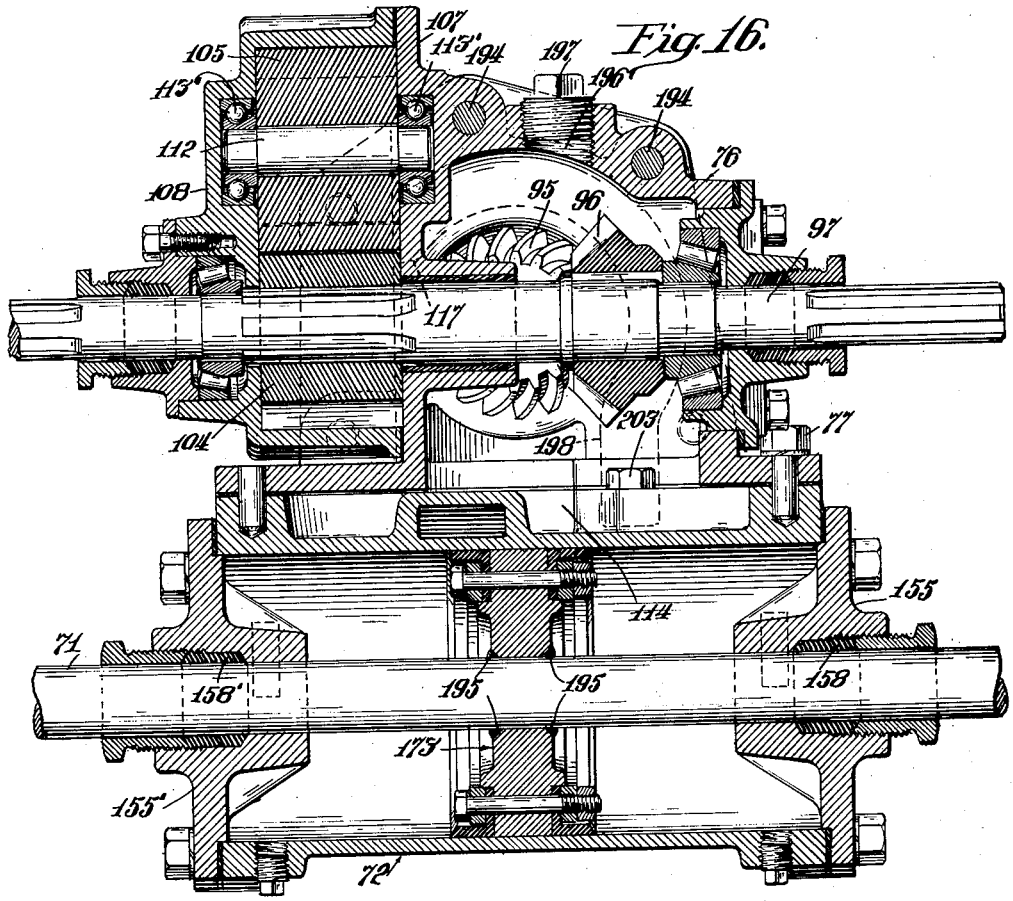
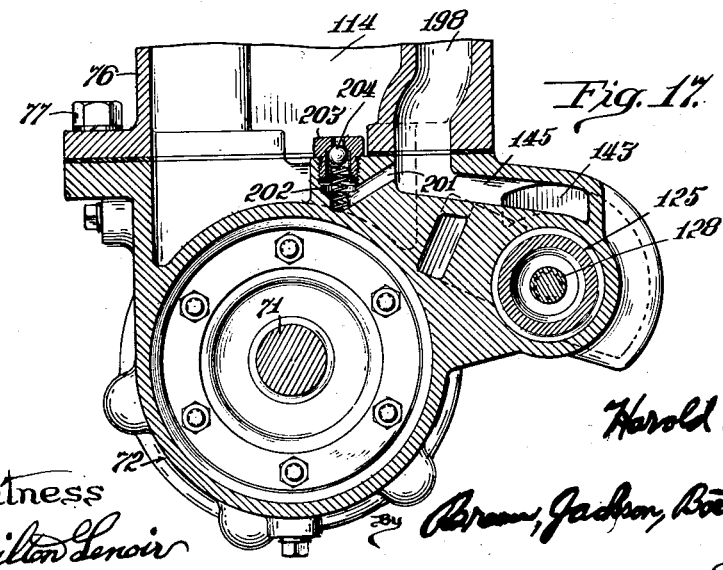

Patented Oct. 10, 1933

1,929,804

UNITED STATES PATENT OFFICE 1,929,804

TRACTOR

Harold Brown, Moline, Ill., assignor to Deere & Company, Moline, Ill., a corporation of Illinois Application December 22, 1930, Serial No. 503,887
Renewed February 23, 1933

40 Claims. (Cl. 97—50)

The present invention relates generally to farm tractors for propelling, carrying and operating agricultural implements.

The fundamental object of the invention is to provide improved mechanism on the tractor driven by the power of the engine for lifting plows, cultivators, etc., to inoperative position, and also capable of adjusting the plowing or cultivating depth of the implements by engine power. That is to say, the mechanism is capable of functioning as a power actuated lifting device and also as a power actuated adjusting device. More specifically, it is one of the objects of the invention to provide such a mechanism which is hydraulically operated. According to the preferred manner of practicing the invention, an oil pump is arranged to be driven by the tractor engine and the oil under pressure is admitted to different sides of a hydraulic motor element such as a piston, for causing the latter to be moved in either direction, this movement being utilized to raise or lower the implement parts. A particular form of control mechanism governing the flow of the oil to and from the piston element enables the piston to be stopped at any desired intermediate position and to be hydraulically locked in this position, from which it will be seen that the implement parts can be raised or lowered to different plowing or cultivating depths in the soil and then locked at these depth adjustments all through the operation of the hydraulic mechanism. This greatly simplifies plowing and cultivating operations by eliminating the necessity of manually effecting these depth adjustments, the control of the present hydraulic mechanism being a simple, easy and convenient operation which can readily be performed while the implement is in motion without distracting the driver's attention from the guidance of the tractor along the furrows or plant rows.

Another object of the invention is to provide a hydraulic mechanism of the above description which can be readily mounted as an attachment or accessory on older types of tractors now in use. In this regard, it is another object to provide this hydraulic mechanism in the form of an attachment which can be associated with an engine driven power take-off attachment on the tractor designed to transmit more or less continuous rotary motion to implement parts, such as continuously rotating seed feeding apparatus, stalk shredding mechanism and the like. The construction is preferably such as will enable the farmer to buy all or part of the engine driven power devices and to install the same on his tractor without requiring expert assistance and without modifying the tractor design. That is to say, if after the farmer has purchased the tractor he should desire to drive some implement part requiring substantially continuous rotary motion for its operation, he may buy only that power take-off attachment which includes the power shaft for transmitting rotary motion. If at a later date he should acquire an implement involving a power lifting and power adjusting operation or some like intermittent motion he may then buy the hydraulic mechanism and associate it with the rotary power transmitting attachment. As above stated, these different sections can be readily mounted on the tractor without any change of the tractor design and without requiring any expert skill.

Another object of the invention is to provide such a hydraulic mechanism in the form of a small compact unit with substantially all of the oil passages cored out in the cast portions thereof, so that the unit can be mounted in a small convenient space on the tractor and so that its installation will not require the making of outside pipe connections with the resulting possibility of leaking joints.

Other objects of the invention are: to provide a construction in which the oil of the hydraulic mechanism is employed to lubricate the operating parts of the rotary power transmitting take-off device; to provide an improved arrangement of pressure relief valve for the hydraulic mechanism; to provide an improved arrangement of controlling valve and associated passages for the hydraulic mechanism; to provide improved actuating means for this controlling valve comprising means for automatically restoring the controlling valve to neutral position; to provide a simple and inexpensive construction which is fool proof in operation; and to provide other features and improvements hereinafter set forth in the following description of a preferred embodiment of my invention. In the accompanying drawings illustrating such embodiment:

Figure 1 is a side view of the present tractor, with the rear traction wheel on the near side cut away to illustrate the hydraulic mechanism to better advantage, this figure also illustrating the cooperation of this hydraulic mechanism with implement parts associated with the tractor;

Figure 2 is a similar view of the tractor alone, on a larger scale;

Figure 3 is a transverse sectional view taken approximately on the plane of the line 3—3 of Figure 2, illustrating some of the power transmitting connections;

Figure 4 is a side view of the power take-off devices, portions of the housings being broken away to illustrate interior constructions;

Figure 5 is a transverse sectional view through these devices and through the adjacent portion of the tractor transmission housing, the view corresponding substantially to a section taken on the plane of the line 5—5 of Figure 4;

Figure 6 is a vertical longitudinal sectional view taken approximately on the plane of the line 6—6 of Figures 5 and 7;

Figure 7 is a transverse sectional view through the power take-off devices and adjacent side of the tractor transmission housing, this view corresponding to a section taken approximately on the plane of the line 7—7 of Figure 4;

Figure 8 is an approximately horizontal sectional view taken substantially on the plane of the line 8—8 of Figure 7;

Figure 9 is a fragmentary view similar to the upper portion of Figure 8 but illustrating the control valve moved to a different postion;

Figure 10 is a vertical sectional view through the control valve chamber and some of its associated passageways, being taken approximately on the plane of the line 10—10 of Figure 7, it being noted that the view is reversed end for end from Figures 8 and 9;

Figure 11 is a perspective view of the valve body of the relief valve mechanism;

Figure 12 is a transverse sectional view taken on the plane of the line 12—12 of Figure 9;

Figure 13 is a detail sectional view taken on the plane of the line 13—13 of Figure 3, illustrating the spring apparatus employed for automatically returning the valve controlling lever to neutral position;

Figure 14 is a detail sectional view on a larger scale of part of this apparatus, being taken on the plane of the line 14—14 of Figure 13;

Figure 15 is a detail section of the upper end of the breather extending from the oil reservoir; and Figures 16 and 17 are longitudinal and transverse sections of a modified construction.

Referring to Figures 1 and 2, in the form of tractor shown, the front end of the frame is supported on steering wheels 16 and the rear end on traction wheels 17. The steering wheels 16 may be disposed relatively far apart and have knuckle pin mounting on the front axle, or these wheels may be disposed relatively close together and be mounted directly on a swiveling axle swinging horizontally under the frame.

The engine, indicated generally at 18, is shown as being of the horizontal type with its crankshaft 19 extending transversely of the tractor, the fly wheel 21 being mounted on one end of this crankshaft, but it will be understood that the invention is not essentially limited to the use of this type of engine. The crank case of the engine comprises an integral part of a long housing 22 extending back to the driving mechanism for the rear wheels, this housing and the engine cylinders constituting the frame of the tractor. Enclosed within the housing 22 is the speed selecting gear mechanism and the differential mechanism through which power is transmitted to the rear wheels 17. Transverse jack shafts 23 extend from this differential mechanism outwardly from the sides of the main housing 22 through extension housings 24 and have sprocket wheels mounted on their ends within chain housings 25. These chain housings extend downwardly from the housing extensions 24 and support the stub axles on which the traction wheels 17 are mounted. Large sprocket wheels on these axles receive chains traveling over the aforesaid sprocket wheels on the outer ends of the jack shafts 23. Within its broad aspects the invention is adaptable to any type of tractor, but there are certain specific features included herein which have particular application or correlation to the type of tractor above described. The operator's position on the tractor is represented by the seat 26 at the rear of the tractor, from which the operations of steering the tractor, controlling the clutch and selective speed transmission mechanism, and controlling the power take-off mechanism are performed.

The various parts of the power take-off mechanism are indicated as a whole at 28. When installed on the type of tractor above described this power take-off mechanism is mounted at the side of the transmission housing 22, but it will be evident that in other types of tractors this mechanism may be located in other positions. In order to disclose to best advantage the utility and cooperation of the hydraulic mechanism for lifting and adjusting implement parts I have shown in Figure 1 certain typical implement parts associated with the tractor and adapted to be lifted and adjusted by said mechanism. The exemplary implement parts shown comprise a front cultivator attachment 29 and a rear cultivator attachment 31, both connected directly with the tractor. The front attachment 29 is of a well known type, similar in many respects to that disclosed in the copending application of Theophilus Brown Serial No. 128,929 filed August 13, 1926, and hence a specific description of all of the details thereof is not necessary. It will suffice to say that the plurality of laterally spaced cultivator rigs 32, on which the cultivator shovels 33 are mounted, have link support on an attachment frame, wheel supported at 34 at each side, and operatively connected to the tractor to be propelled thereby through attachment parts comprising diagonally extending outrigger beams 36 pivotally connected at their rear ends to the tractor. The front ends of the rigs 32 are connected to the attachment frame through links 37, and all of the rigs are raised and lowered in unison through the actuation of a rockshaft 38 transversely extending and supported on the attachment frame. An arm 39 extending inwardly from this rockshaft above each rig is operatively connected with its individual rig through lifting link parts, generally indicated at 41. The vertically extending crank handle 42 is illustrative of a conventional individual depth adjusting connection by which the cultivating depth of each rig may be adjusted relatively to the other rigs, this type of individual depth adjustment being old and well known.

The lifting of all of the front rigs to transport position is effected by forward thrusting movement of a link 43 which is pivotally connected at its front end to an arm 44 extending from the rockshaft 38. The rear end of said link is pivotally connected to a lever 45 suitably supported either on the tractor or on the cultivator attachment, and extending back from this lever is another link 46 which is pivotally connected at 47 to a swinging bail member 48 mounted adjacent to the power take-off mechanism 28.

The rear cultivator attachment 31 is illustrated as comprising rig beams 51 having cultivating tools 52 mounted thereon and pivotally connected at their forward ends at 53 to the chain housings 25. These rigs are raised and lowered through the operation of a transverse rockshaft 54 supported on the tractor and operatively connected with the rig beams through arms 55 each having a link connection 56 with one of the rig beams. An extension arm 57 projecting from one of the lifting arms 55 has pivotal connection with a link 58, the front end of which is also pivotally connected to the bail member 48 at the pivot 47. It will be evident that forward motion of the pivot point 47 is operative to raise both the front and rear sets of rigs, and conversely rearward motion of this pivot point is operative to lower the rigs. The lifting link connections 41 of each front rig include a compression spring 59 and the lifting link connections 56 of each rear rig likewise include a compression spring 61, both springs serving to yieldingly transmit downward movement to the rigs so that in the power operation of lowering the rigs if they should encounter hard ground or some obstruction the springs will yield and allow the motion transmitting connections to complete their movement without breakage of the parts.

Referring to Figure 3, the bail member 48 has the upper ends of its laterally spaced arms mounted on a transverse shaft 62 which is supported at one end in a bracket 63 bolted to the inner side of the adjacent chain housing 25, and which is supported at its other end in a bracket 64 secured by bolts 65 to the rear end of the transmission housing 22. The lower portion of this bail shaped pendant or lever has a pivot pin 66 extending through the lower closely spaced side portions, and mounted upon this pin between these side portions is a link 67. The front end of this link is connected by a pivot pin 68 to a coupling head 69 which is mounted at the rear end of a piston rod 71. Said piston rod enters a cylinder 72 constituting part of the power take-off mechanism 28, where this rod is operatively connected to a reciprocating piston 73. Referring to Figure 6, the ingress and egress of oil to the opposite ends of the cylinder 72 is through passages 74 and 75. Both ends of the cylinder are constantly full of oil and to produce movement of the piston 73 in one direction or the other oil is forced under pressure into one end of the cylinder through one of the aforesaid passageways, and at the same time oil is permitted to discharge from the other end of the cylinder through the other passageway. When both passageways 74 and 75 are closed the piston 73 is hydraulically locked in fixed position by the incompressible bodies of oil on opposite sides thereof, and this locking of the piston can be accomplished at any point in its stroke by closing the passages 74 and 75 as soon as the piston has been moved to the predetermined position.

It will be seen from the description thus far that the piston 73 functions as a power operated moving element having the two-fold utility, first, of lifting all of the cultivating rigs to their transport positions clear of the ground, as for turning the implement and, second, effecting a master depth adjustment of all of the rigs whereby the cultivating depth of the rigs may be increased or decreased by a power operation. With reference to the latter feature, the hydraulic principle of operation enables depth adjustment of any desired degree to be made because the piston can be stopped and locked at an infinite number of points in its stroke. Heretofore, the making of a master depth adjustment of the front cultivating rigs 32 required the operator to rotate a crank or like control member which, in one typical embodiment, operated a screw and traveling nut interposed between the front end of the ling 43 and the arm 44, such involving a relatively slow and laborious operation. In the present structure it is only required that the operator slightly move a valve control lever whereupon the piston 73 instantly responds to an inflow of oil under pressure at one side and a discharge of oil from the other side whereby the emplement parts are instantly raised or lowered. The same power lifting and power adjusting operation can be employed in the case of separate, wheel-supported implements propelled by the tractor and disposed either at the rear, front or side of the tractor.

Referring now to a detail disclosure of the power take-off mechanism and to the particular manner in which the oil is pumped and directed to opposite sides of the piston 73, it will be seen from Figures 5–7 that the cylinder 72 has a flat top portion which is secured to an upper housing 76 by bolts 77 passing through marginal attaching flanges on the cylinder and on the upper housing. Dowel pins 78 carried by one of these flanges enter openings in the other flange for insuring proper registration of the castings and for aiding in sustaining the implement lifting stresses reacting on the cylinder, and a gasket 79 between said flanges seals an oil reservoir defined between the castings, which I shall presently describe. The upper housing 76 is rigidly secured to the side of the transmission housing 22 adjacent to the lower edge thereof, which enables the valve enclosing housing portion 81 on the lower cylinder casting 72 to extend inwardly under the transmission housing 22. As shown in Figure 5, bolts 82 secure an attaching flange 83 of the upper housing to the side wall of the transmission housing. Referring to Figure 7, a cylindrical hole 84 is provided in the side wall of the transmission housing and extending inwardly through this hole is a boss 85 formed integrally with the attachment housing 76. Mounted in said boss is a transverse shaft 86 on the inner end of which a pinion 87 is keyed. This pinion is pushed into mesh with an idler gear 88 when the boss 85 is inserted into the hole 84 in the mounting of the attachment housing 76 on the side of the tractor.

This hole 84 may normally be closed by a suitable cover plate, the same being removed when the attachment housing is to be mounted on the tractor. The idler gear 88 is mounted for idling rotation on a countershaft 89 constituting part of the selective speed transmission within the housing 22. Another driving gear, not shown, is slidably mounted on the main driving shaft of the transmission and is adapted to be slid into and out of mesh with the idler gear 88 for transmitting power to the power take-off attachment or for interrupting such transmission of power. Mounted in the boss 85 is a bearing bushing 91, which is screwed into the boss and locked therein by the lock nut 92. Inner and outer roller bearings 93 are provided in the bushing for supporting the shaft 86, and a packing ring 94 is interposed between these bearings to keep the lubricant in the transmission housing 22 separated from the oil in the attachment housing 76.

A spiral bevel gear 95 mounted on the inner end of the shaft 86 meshes with another spiral bevel gear 96 and transmits power to a longitudinally extending power take-off shaft 97 on which the latter gear is mounted. This shaft is supported in roller bearings 98 and 99 at the front and rear ends of the upper housing section, and the shaft has its ends projecting outwardly beyond the ends of the housing for effecting coupling engagement through splined connections with power transmitting shafts extending either to implement parts at the front end of the tractor or at the rear end thereof, or both. This continuously rotating power take-off shaft 97 enables continuously operating implement parts to be driven from the tractor, such as seed feeding apparatus, conveyors, etc. as I have previously described. Surrounding the shaft 97 and disposed outwardly of the bearings 98 and 99 are caps 101 and 102 which are suitably secured to the ends of the housing and have packing material engaging with the shaft for preventing the loss of lubricant. It will be noted from Figures 2 and 3 that the projecting ends of the take-off shaft 97 clear the fly wheel 21 and the two housings 24 and 25, and that the rear end of said shaft substantially aligns with the open space through the bail-shaped lever 48 so that a rear extension shaft can be passed through this space in the lever.

The oil pump for transmitting hydraulic pressure to the piston 73 is preferably driven directly from the take-off shaft 97, such pump comprising two spur gears 104 and 105, the gear 104 being non-rotatably secured directly on the shaft 97 through the splines 106. These gears rotate in a closely fitting pumping chamber defined between the end wall 107 of the housing 76 and a cup-shaped casing 108 which is secured to said end wall by the bolts 109, Figure 4. Dowel pins 111 extend between said end wall and said casing for insuring proper registration of these parts and for assisting in sustaining the torque forces set up in the casing 108. The upper pumping gear 105 is mounted on a shaft 112 which is journaled in bearing bushings 113 supported in the end wall 107 and in the casing 108. The roller bearing 98 and packing head 101 for the shaft 97 are carried by the casing 108. As previously remarked, the space within the take-off housing 76, which space is indicated at 114, serves as a reservoir for the pumping oil of the hydraulic system, and this reservoir is sealed from the pump chamber by a packing 115 carried by the end wall 107 and surrounding the take-off shaft 97.

Referring to Figure 5, the oil is supplied to the gear pump through a passage 117 opening into the side of the pump casing through the end wall 107, this passage communicating with both gears at one side of the line of mesh. The oil under pressure is discharged from the casing through a passage 118 which leads from the pump chamber at a point on the other side of the line of mesh, this passage also extending through the end wall 107. The pump supply passage 117 extends in the form of a duct or pipe 117′ leading down through the oil reservoir 114 and communicating with the outlet port of the main controlling valve, this duct having a plurality of perforations 117″ therein opening into the reservoir 114. The pump discharge passage 118 extends downwardly as a duct formed integrally in the end wall 107 and communicates at its lower end with the front end of a transverse passage 119 formed integrally in the top of the cylinder casting 72 and passing rearwardly across the top of the cylinder space. The rear end of the passage 119 opens into a manifold passage 121 having three branch ports 122, 123, 123a opening into a cylindrical valve chamber 124 provided in the longitudinal, rearwardly extending housing portion 81 formed on the back side of the cylinder casting 72. Sliding in this chamber is a piston valve 125 comprising two intermediate piston portions 126 and 126a and two end piston portions 127 and 127a, all interconnected by a reduced stem portion 128 extending from end to end of the piston valve. An actuating rod 129 screws into this stem portion and passes out through the end of the valve chamber for operative connection with a control lever 131 which I shall presently describe. The ends of the valve chamber 124 are closed by suitable heads 132 and 133, the latter having a gland packing 134 for preventing the outward leakage of oil along the valve actuating rod 129. The space between the two intermediate piston portions 126, 126a defines an annular transfer passage 136, and the spaces between these intermediate pistons and the two outer pistons 127 and 127a define annular transfer passages 137 and 137a respectively. All four piston portions have suitable piston rings 138 for preventing leakage of oil past the pistons. The three manifold parts 122, 123 and 123a, and in fact all other ports opening into this valve chamber, to be later described, are constructed in the form of subdivided port areas having bridge portions spanning each port, as best shown in Figure 7, so that the piston rings 138 will slide freely over the ports.

The valve is normally in the position illustrated in Figure 8, and at this time the oil being discharged under pressure from the gear pump passes through the manifold ports 122, 123 and 123a into the three annular transfer passages in the valve. The two end passages 137, 137a do not at this time communicate with any other ports and hence there is no flow from these passages, the pressures created therein balancing each other in the valve structure. The intermediate transfer passage 136 is at this time communicating with a port 141 formed in the opposite wall of the valve chamber and this port conducts the oil under pressure into a cored passage 142 extending up and over the top of the valve housing and opening into a longitudinally extending discharge passage 143 which is cored out along the top portion of the valve housing. As shown in Figure 10, the ends of said longitudinal passage communicate with opposite ends of the piston valve chamber through ports 144 and 144a which are cored in the end heads 132 and 133. Hence with the valve in this neutral position illustrated in Figures 8 and 10 the oil pressure is conducted to the opposite ends of the piston valve. Referring to Figures 10 and 12, a short duct 145 extends inwardly from the longitudinal passage 143 toward the oil reservoir 114, and the inner end of this duct communicates with the return conduit 117′ which conveys the oil up to the inlet port 117 of the gear pump. From the foregoing it will be seen that the oil under pressure, which is continuously supplied from the gear pump under normal operation, is circulated from the outlet port of the pump down through the supply passage 119 and manifold passage 121 to the valve chamber, and is thence conducted through the transfer passage 136 of the valve to the return port 141 and thence through the passages 142, 143, and 145 to the duct 117' which conveys back to the inlet port of the pump.

The two passages 74 and 75 which I have previously described as serving to supply oil to and discharge it from the opposite ends of the power cylinder 72 extend inwardly to the valve chamber and open into said chamber through port areas 74' and 75', see Figures 8-10. With the valve in the neutral position illustrated in Figures 8 and 10 the two end piston portions 127 and 127a lie directly over these ports and completely close the same against admission of oil to either end of the cylinder, or discharge of oil from either end of the cylinder. Both ends of the cylinder and the aforesaid passages communicating therewith are continuously filled with oil, and these volumes of oil function as incompressible bodies at this time for hydraulically locking the piston 73 in whatever position it then occupies. If it is desired to move the piston rearwardly, or to the right as viewed in Figures 6 and 8, as for lowering the implements down into operative position, or for forcing them down further into the soil for a greater cultivating or plowing depth, the piston valve 125 is moved to the left approximately to the position illustrated in Figure 9. This moves the piston portion 126a over the central admission port 122, moves the end piston portion 127 away from the port 74' leaving this port communicating with the end admission port 123 through the transfer passage 137, and moves the other end piston portion 127a away from the port 75' but over the end admission port 123a, closing the latter and opening the port 75' into the valve chamber beyond the valve body. Hence, the oil under pressure can only pass through the end admission port 123 and this oil passes through the transfer passage 137 and down through the port 74' and passage 74 to the left-hand end of the power cylinder where its pressure acts on the piston tending to force it to the right. At the same time the body of oil in the right-hand end of the power cylinder is permitted to discharge upwardly through the passage 75 and port 75' into the right-hand end of the valve chamber from whence it flows through passage 144a, longitudinal passage 143 and duct 145 and conduit 117 up to the inlet port of the pump. The piston will continue to move to the right, within the limits of its stroke, as long as the oil under pressure is thus fed into the left-hand end of the power cylinder and the oil from the right-hand end of the cylinder is discharged back either to the reservoir 114 or to the inlet port of the pump. After the piston has moved to the desired position, or to the pre-determined limit of its movement, the restoration of the valve to the neutral position illustrated in Figures 8 and 10 will interrupt further admission of oil to the left-hand end of the cylinder and will interrupt discharge of oil from the right-hand end thereof, leaving the piston hydraulically locked in this position and with the oil flowing through its normal circuit previously traced. Movement of the piston to the left, as for lifting the implements to transport position, or for raising them to a shallower cultivating or plowing depth, of course follows upon the movement of the piston valve to the right at which time oil under pressure is supplied to the right-hand end of the power cylinder through the ports and passages 123a, 137a and 75, and oil is discharged from the left-hand end of the power cylinder through the passages 74, 144, 143, etc., in substantially the reverse relation to that above described.

A pressure relief valve 147 communicates with the oil circulating system, preferably at a point between the discharge port of the gear pump and the admission passages 122, 123, 123a, for relieving any abnormal injurious pressure which might arise through an excessive load reaction on the power piston or through a relatively slow actuating movement of the piston valve, or through clogging of any of the passages. As shown in Figure 8, this relief valve normally closes a port 148 extending laterally from the front end of the transverse passage 119. From the rear side of the valve a passage 149 extends upwardly (Figure 4) through the cylinder casting and opens into the reservoir 114, whereby opening of this valve establishes a shunt passageway from the admission passage 119 directly back to the reservoir, thereby by-passing the valve mechanism and also the power cylinder. As shown in Figure 11, the valve preferably comprises a rear guiding disk portion 147' united with the main valve head through a stem 147'', and a spring 151 confined in a cored opening aligned with the port 148 normally holds the valve pressed against the port seat. A plug 152 screws into the outer threaded end of this cored opening, sealing the same against leakage and also providing a means whereby the compression of the spring 151 can be increased or decreased for loading the valve to greater or lesser oil pressures. The spring loading may be such that the valve will relieve any pressures which might be calculated to injure the implements in their lifting or lowering movements.

The ends of the power cylinder 72 are closed by heads 154 and 155 which are secured to the cylinder casting by bolts or cap screws 156, and the right-hand head 155 is provided with a guide boss 157 and gland packing 158 for the piston rod 71. The piston 73 may be provided with any suitable packing means, such as the cup washers 159 and may be secured to the piston rod by a cooperating nut and shoulder substantially as shown.

If desired, the duct 145 leading from the discharge side of the valve mechanism may open directly into the reservoir 114 instead of being connected with the conduit 117', and this conduit may merely be extended down to draw oil from a suitably low point in the reservoir 114 for supplying oil to the pump. An advantage, however, accrues to the practice of having this duct 145 open directly in the lower end of the conduit 117', with the latter provided with the restricted perforations 117'' communicating with the reservoir 114. When an implement such as a plow or a cultivator rig is lowered from transport position to operating position the entire weight of the lifted parts acts to force the piston 73 from one end of the cylinder to the other. This causes the oil from the discharging end of the cylinder to be projected through the return duct 145 at a rather high velocity which may under some conditions create a turbulent disturbance in the reservoir. By connecting the duct 145 with the lower end of the conduit 117' a large part of the energy of this high velocity discharge is dissipated in attempting to drive the gear pump, and the excess oil passes out into the reservoir through the restricted perforations 117″. The upper end of this duct is readily disconnectible from the intake port opening into the pump chamber so that this duct can be attached and detached in the mounting of the lower casting 72 on the upper power takeoff housing 76.

The reservoir 114 is normally filled with oil up to the level of the pet cock 162 projecting from the front of the upper housing 76, Figure 4. The top of this housing is provided with an opening 163 which is normally closed by a cover plate 164 suitably held in place by screws. Extending upwardly from this cover plate is an elbow pipe 165 supporting a breather 166 which is closed at its upper end by a threaded cap 167 having a small breathing orifice 168, see Figure 15.

Referring now to the valve controlling mechanism, it will be seen from Figures 2 and 3 that the rear end of the valve stem 129 is provided with a clevis or forked coupling member 171 which embraces the lower end of the valve controlling lever 131, this clevis carrying a transverse pin 172 which engages in the slot 173 in the control lever. Said lever is pivoted on a pin 174 mounted on an arm 175 extending forwardly from the bracket 64. Mounted on the upper portion of said lever is a thrusting block member 176 (Figures 13 and 14) which has swiveled support for rocking movement on the side of the lever through the stud and nut 177. Slidably mounted in a cylindrical opening 178 in said thrusting member is a rod 179 which is pivotally supported at 181 on the side of the transmission housing 22. A diametrical pin 182 mounted in the rod 179 has its projecting ends normally disposed in grooves 183 formed in the thrusting member 176. Two compression springs 184 and 184′ are mounted on the rod 179 on opposite sides of the thrusting member 176. The inner ends of said springs bear against slidable collars or washers 185, 185′ which press against opposite sides of the thrusting member 176, and the outer ends of said springs bear against outer collars 186 and 186′ suitably secured to the rod 179, the collar 186 being adjustable endwise through a nut 187 screwing over said rod. The two springs tend normally to hold the lever 131 in the neutral position shown, which also holds the piston valve 125 in the neutral position illustrated in Figures 8 and 10. Movement of the lever either forwardly or rearwardly compresses the spring in advance of said lever, and consequently when the lever is released it is automatically returned to its neutral position by this spring, for automatically returning the piston valve to its neutral position. The stop pin 182 prevents the spring and washer on the opposite side from following the lever in its hand-actuated movement and hence the compressed spring is always operative to return the lever to the same neutral position.

Provision is also made for forcibly returning the control lever and piston valve to their neutral positions when the power piston 73 has reached either limit of its stroke. Referring to Figures 2 and 3, it will be noted that an arm 189 projects fixedly from the side of the piston rod 71 and has a forked end which embraces and slides along the valve stem 129 in the movement of the piston. Two stop collars 191 and 191′ are mounted on the valve stem 129 in such positions as to be engaged by the arm 189 for shifting the piston valve to neutral position after the power piston has reached either limit of its stroke. The power thus effective to move the valve to neutral position is sufficient to overcome any effort which the operator might accidentally be exerting on the control lever 131 for holding the same in one of its valve shifted positions.

From the foregoing it will be seen that the only act required to raise or lower the implements is for the operator to move the control lever 131 in one direction or the other and to then release the same, the restoration of the lever to its proper neutral position being effected automatically by one or the other of the springs 184, 184′ without requiring his attention. Holding the lever in its shifted position for a longer or shorter time enables him to adjust the vertical position of the implements in either their raised or lowered positions, and then upon releasing the lever the implements are hydraulically locked in such position. If the operator should hold the lever in one of its shifted positions until the power piston and the implement had reached predetermined limits in their movements the piston automatically exerts restoring force against the lever, whereupon the operator releases the lever permitting the compressed spring 184 or 184′ to complete the shift of the lever and piston valve back to their neutral positions. Thus, the power lifting operation and the power depth adjusting operation only require a comparatively simple and convenient control actuation which does not distract the attention of the operator from his guidance of the tractor relatively to the plowed furrows or plant rows.

Figures 16 and 17 illustrate a modified construction, differing from the previous embodiment principally in having the power piston rod 71 extending out from both ends of the power cylinder 72, and differing also in the manner of circulating the oil and replenishing the circulating volume from the reservoir 114. In its general arrangement this modified embodiment is the same as that previously described, comprising the upper housing 76 having the rotary power take-off shaft 97 journaled therein and driven through the bevel gears 95, 96, and having the power cylinder 72 secured to the bottom of the upper housing 76. In this form the shaft 112 of the upper pumping gear 105 is shown as being journaled in ball bearings 113′ carried by the end wall 107 of the upper housing 76 and by the casing 108. Two bolts 194 pass through the upper portion of the housing 76 and engage with the transmission housing of the tractor, these bolts cooperating with the bolts 82 (Figure 5) in securing the take-off mechanism to the tractor.

The piston rod 71 extends outwardly through both cylinder heads 155, 155′ having the gland packings 158, 158′ for preventing leakage out along the piston rod. The piston 73 may be rigidly secured to the rod in any desired manner, Figure 16 illustrating the piston welded to the rod at 195. Having the piston rod extend from both ends of the cylinder, possesses two desirable advantages. First, it enables a power lift connection to be quickly and easily established to opposite ends of the piston rod for actuating implement parts at the front and rear ends of the tractor, as for raising these implement parts to transport position and for adjusting the soil tilling depths of the parts; such arrangement also simplifying the construction by enabling the bail shaped lever 48 to be dispensed with, if desired. Second, by having the piston rod extend from both ends of the cylinder the total liquid displacement of the system is always constant irrespective of the position of the piston in the cylinder 72. This eliminates the necessity of any breather and makes it possible to positively close the entire system. It will be noted that the top of the upper housing 76 is provided with a filler opening 196 through which oil may be introduced into the reservoir 114, this opening being normally closed, however, by the plug 197.

In this modified construction the oil is returned from the power cylinder or controlling valve directly to the intake 117 of the gear pump, the connection of the reservoir 114 to the oil circulating system being such as only serves to replenish the supply of oil in the closed system. Referring to Figure 17, the short return duct 145, which, as previously described, receives the oil returned from the power cylinder or from the controlling valve 125, is in this instance connected with a return passageway 198 which is cored out in the back wall of the upper housing 76. As shown in dotted lines in Figure 16, this return passage 198 extends up and over the opening for the drive shaft 86 and terminates at the inlet port 117 opening into the inlet side of the gear pump 104, 105. Thus all of the oil returned from the power cylinder and from the control valve 125 is conducted directly to the intake of the gear pump, and the result is that the system is closed against egress of oil, always handling substantially the same volume so that the power piston is virtually compelled to move in step with the gear pump when shifting to one position or the other even though the weight of the plows or other load is tending to move the piston in its intended direction of travel at a quicker rate.

The oil reservoir 114 is so connected with the oil circulating system that pressure in the return passage 198 or any other point of the system is incapable of forcing oil back into the reservoir, but the reservoir is capable of supplying oil to the circulating system to replenish any slight losses which might result from leakage at the moving part joints. As shown in Figure 17, a channel 201 extends from the return duct 145 and opens into the lower end of a threaded bore 202 formed in the upper portion of the cylinder casting. A valve cage or guide 203 is screwed into the upper end of this bore and has a port opening into the reservoir 114. A ball check valve 204 is pressed lightly against an upper seat in the valve plug 203 by a compression spring 205, the valve thereby functioning as a check valve to prevent pressure within the return duct 145 from being transmitted into the reservoir 114. If at any time the pressure in this return duct, corresponding to the low pressure side of the system, falls below atmospheric pressure the check valve 204 will open and permit a replenishing supply of oil to flow from the reservoir 114 into the system at the return duct 145. The pressure in the return duct will ordinarily only fall below the atmospheric pressure in the reservoir when there has been some leakage from the system, which loss is comparatively slight, the oil in the reservoir thus functioning merely as a reserve supply. By this arrangement it will be noted that the oil in the reservoir is never at a pressure higher than atmospheric pressure and in consequence there is a minimum tendency for this oil to leak past the packing 94 and into the transmission housing 22 of the tractor.

The farmer in adapting his tractor to power take-off uses may obtain and use only the upper portion of the attachment for transmitting rotary take-off power to rotating implement parts such as seed feeding devices, stalk shredding mechanism, etc., such upper portion comprising the housing 76, the rotary take-off shaft 97 and the beveled gear driving means 95, 96. When installed on the tractor in this relation the cylinder casting 72 would be omitted and the bottom of the upper housing 76 would be closed by a detachable closure plate. The pumping gears 104 and 105 would also be omitted; and as an alternative arrangement suitable roller bearings might be provided in the end wall 107 of the housing 76 so that the entire pump housing 108 might be omitted. If it is desired to supplement this apparatus at a later date with the hydraulic mechanism it is only necessary to remove the bottom closure plate from the housing 76, bolt the cylinder casting 72 to the bottom of said housing, and place the pump gears 104 and 105 in the pump housing 108. The installation of the hydraulic mechanism can be easily and conveniently made in fool-proof manner because all pipe connections and other joints inherently susceptible to leakage are eliminated by the coring of all fluid passageways directly in the castings. As previously described, the conduit 117' of the first embodiment, Figures 4 to 12, is optional, and where this conduit does not extend between the duct 145 and the pump inlet a passage comparable to the passage 118 may be cored in the end wall 107 to extend from the pump inlet down to the lower portion of the oil reservoir 114 or the return may be direct through the cored passage 198 as described of Figures 16 and 17. By having the oil reservoir 114 constructed as the same housing which encloses the bevel gears 95, 96 a compact construction is obtained and automatic adequate lubrication of these gears is always insured. The mounting of the pump gear 104 directly on the rotary power take-off shaft 97 also aids in making the construction compact and simple. The transmission of power to the take-off mechanism through the gears 87 and 88 can be effected continuously as long as the engine 18 is running and irrespective of whether the tractor is traveling or standing stationary. Complete interruption of the drive to all of the power take-off mechanism can be effected by shifting the slidable gear, not shown, out of mesh with the idler gear 88.

In speaking of the utility of the hydraulic mechanism I have referred pointedly to its direct cooperation with soil tilling implements for raising these implements and adjusting their tilling depths, such probably being the most important utility of the mechanism, but it will be understood that these same principles of operation can be utilized to advantage for effecting other power operations associated with the tractor, or with implements carried by or propelled by the tractor. For example, the hydraulic mechanism may be employed to shift a draft bar laterally relatively to the tractor and to hold such draft bar in any of its shifted positions, such as has been disclosed in the copending application of Theophilus Brown, Serial No. 481,650, filed September 13, 1930.

While I have shown and described what I regard to be the preferred embodiment of my invention, nevertheless it will be understood that such is merely exemplary and that numerous other modifications, rearrangements and uses of the mechanism may be made without departing from the spirit and scope of the invention.

What I claim is:

1. The combination with an engine driven tractor and an implement adapted to be propelled thereby and comprising an implement part adapted to be shifted from one position to another; of power actuated shifting mechanism associated with the tractor and comprising a hydraulically actuated member movable under power derived from the engine of the tractor, operating connections between said member and said implement part for shifting the position of the latter with respect to the tractor, and control means for hydraulically holding said movable member at any one of several points in the path of its movement for adjusting the operative position of said implement part.

2. The combination with an engine driven tractor and an implement adapted to be propelled thereby and comprising an implement part adapted to be raised and lowered; of power lifting and adjusting mechanism associated with the tractor and comprising a hydraulically actuated member movable under power derived from the engine of the tractor, operating connections between said member and said implement part for raising or lowering the latter, and control means for hydraulically holding said movable member at any one of several points in the path of its movement for adjusting the operative position of said implement part.

3. The combination with an engine driven tractor and an implement adapted to be propelled thereby and comprising an implement part adapted to be raised and lowered; of power lifting and adjusting mechanism associated with the tractor and comprising a hydraulic pump driven from the engine of the tractor, a movable member actuated by the hydraulic pressure from said pump, operating connections between said member and said implement part for raising or lowering the latter, and control means for hydraulically locking said movable member at any one of several points in the path of its movement for adjusting the operative position of said implement part.

4. The combination with an engine driven tractor and an implement adapted to be propelled thereby, and comprising a part adapted to be moved to different positions in the operation of the implement; of power take-off mechanism associated with the tractor and comprising a hydraulic pump driven from the engine of the tractor, a cylinder member and a piston member therein, operating connections between one of said members and said implement part for transmitting movement to the latter, and means controlling the admission and discharge of the pumped liquid to and from said cylinder and being operative through said liquid to hydraulically lock the movable member at numerous points in the path of its movement whereby to adjust said implement part to different positions and to lock said implement part in the selected position.

5. The combination with an engine driven tractor and an implement adapted to be propelled thereby and comprising a part adapted to be moved to and locked in different positions in the operation of the implement; of power take-off mechanism mounted on the tractor and comprising a hydraulic pump driven from the engine of the tractor, a cylinder, a piston in said cylinder, operating connections between said piston and said implement part for moving the latter upon the movement of said piston, passages connecting said hydraulic pump with said cylinder, and means controlling the ingress and egress of the pumped liquid to and from opposite ends of the cylinder for effecting movement of the piston in opposite directions, said latter means being operative to confine liquid in opposite ends of said cylinder for hydraulically locking said piston with said implement part in any one of a plurality of positions.

6. In an agricultural implement, the combination with a tractor including an engine, of implement means comprising a soil working device connected adjacent to one end of the tractor, and hydraulically actuated power take-off mechanism mounted on the tractor, deriving power from the engine thereof, and operatively connected with said soil working device for raising and lowering the latter between transport and operative positions and for hydraulically locking said device at different soil working depths.

7. In an agricultural implement, the combination with a tractor including an engine, of implement means comprising a soil working device connected with the tractor, power take-off mechanism mounted on the tractor comprising a hydraulic pump driven from the tractor engine, a hydraulic motor, operating connections between said motor and said soil working device for moving the latter from one position to another, and valve means for controlling the flow of liquid between said pump and said motor to hydraulically hold said connections in the different positions to which they may be moved by the operation of said motor.

8. In an agricultural implement, the combination with a tractor including an engine, of an attachment comprising a frame connected with the front portion of the tractor, cultivating rigs movably mounted on said frame, power lifting mechanism mounted on the tractor and comprising a hydraulic pump driven from the tractor engine, a cylinder, a piston in said cylinder, operating connections between said piston and said cultivating rigs operable to raise said rigs to transport position, a liquid circulating system connecting said pump with said cylinder, and valve means for controlling the admission and discharge of liquid to and from said cylinder, to hydraulically hold said connections in the different positions to which they may be moved by the operation of said motor.

9. The combination with a tractor comprising an engine, of power take-off mechanism on the tractor comprising a rotary power take-off member, gear means for driving said rotary member from said engine, a reciprocating power take-off member, and hydraulic means driven from said engine for reciprocating the latter member, including valve mechanism for holding the same in a stationary position at any desired point.

10. The combination with a tractor comprising an engine, of power take-off mechanism on the tractor comprising a rotary power take-off member driven from the engine of the tractor, a reciprocating power take-off member, and hydraulic means for transmitting power from said rotary member to said reciprocating member, including valve mechanism for holding the same in a stationary position at any desired point.

11. The combination with a tractor including traction wheels, an engine, and means for driving the traction wheels from said engine, of a first power take-off unit comprising a casing having a power take-off shaft mounted therein, means for mounting said casing on the tractor, and means for operatively connecting said shaft with one of the engine driven parts of the tractor, of a second power take-off unit comprising a cylinder, a piston therein and a power transmitting member actuated by said piston, means for securing the cylinder of said second unit to the casing of the first unit, and hydraulic means for transmitting engine power through the casing of said first unit to said cylinder and piston, to move said piston in either direction, and to hold it stationary at any desired point.

12. The combination with a tractor including traction wheels, an engine, and means for driving the traction wheels from said engine, of a first power take-off unit comprising a driving shaft element for transmitting rotary take-off power to an implement, a second power take-off unit comprising a cylinder having a piston therein for transmitting oscillatory take-off power to an implement, means for mounting one of said units on the tractor and establishing operative relation between its driving element and the engine, and means for mounting the other of said units on the above mentioned unit and establishing operative relation between the two driving elements of both units.

13. The combination with a tractor including traction wheels, an engine, and means for driving the traction wheels from said engine, of power take-off mechanism comprising a first unit having a shaft constantly driven from said engine for transmitting rotary take-off power to an implement, a second unit having a hydraulically operated reciprocating member for intermittently transmitting take-off power to an implement, means for mounting said first unit on the tractor in power transmitting relation, said unit being capable of operation when mounted on the tractor alone, and means for mounting the other unit on the tractor in cooperative driving relation to the first unit.

14. The combination with a tractor including an engine, of power take-off mechanism comprising a housing adapted to be mounted on the tractor, a shaft carried by said housing, gear mechanism within said housing for driving said shaft from one of the engine driven parts of the tractor, and hydraulically actuated power take-off mechanism comprising an oil circulating system including said casing whereby the oil circulated in said hydraulically actuated power take-off mechanism is utilized to lubricate the gear mechanism in said casing.

15. The combination with a tractor including an engine, of a power take-off unit comprising a casing having a rotating power take-off shaft mounted therein, means for mounting said casing on the tractor, means for operatively connecting said shaft with one of the engine driven parts of the tractor, hydraulically actuated power take-off mechanism comprising a cylinder and a piston, and a hydraulic pump for pumping liquid under pressure to said cylinder, said hydraulic pump comprising two cooperating pumping gears one of which is mounted on said rotary power take-off shaft.

16. The combination with a tractor including an engine, of power take-off mechanism mounted on the tractor comprising housing portions defining a cylinder and a pumping chamber, a piston reciprocating in said cylinder, pumping means operating within said chamber, means for driving said pumping means from the tractor engine, a liquid circulating system comprising passages cored in said housing portions and connecting said pumping chamber with said cylinder and valve means for controlling the flow of liquid through said passages.

17. The combination with a tractor including an engine, of power take-off mechanism mounted on the tractor comprising a hydraulic pump, means for driving said pump from the power of the tractor engine, a hydraulic motor adapted to transmit motion to implement parts associated with the tractor, a liquid circulating system connecting said pump and said motor for transmitting power to the latter, and a pressure relief valve associated with said circulating system for limiting the maximum force which can be exerted by said hydraulic motor.

18. The combination with a tractor including an engine, of hydraulically actuated power take-off mechanism on the tractor comprising a hydraulic pump arranged to be driven from the power of the tractor engine, a hydraulic motor arranged to be driven from said hydraulic pump and adapted to transmit movement to implement parts associated with the tractor, valve means for controlling the flow of liquid between said pump and said motor, control means for actuating said valve means, and means for automatically returning said valve means and said control means to to a neutral position after the operation of said control means.

19. The combination with a tractor including an engine, of a hydraulically actuated power take-off mechanism on the tractor comprising a hydraulic pump arranged to be driven from the power of the tractor engine, a hydraulic motor comprising a cylinder and piston, valve means controlling the flow of liquid under pressure from said hydraulic pump to said cylinder, and means automatically responsive to the movement of said piston for moving said valve means to a neutral position for interrupting the flow of liquid to said cylinder.

20. The combination with a farm tractor including an engine, of a hydraulically actuated power take-off mechanism on the tractor comprising a hydraulic pump, means for driving said pump from one of the engine driven parts of the tractor, a cylinder and a piston reciprocating therein adapted to transmit power to one of the intermittently actuated parts of an implement associated with the tractor, a liquid circulating system connecting said hydraulic pump with said cylinder, a valve for controlling the flow of liquid through said circulating system, a control member operatively connected with said valve and movable in opposite directions from a neutral position for moving said valve to admit liquid under pressure to opposite ends of the cylinder, spring means for automatically returning said control member to said neutral position when actuating pressure on said control member is removed, and means responsive to the travel of said piston for automatically shifting said valve to a neutral position when said piston approaches either limit of its stroke.

21. The combination with a farm tractor including an engine, of a hydraulically actuated power lift mechanism on the tractor comprising a hydraulic pump, means for driving said pump from one of the engine driven parts of the tractor, a cylinder having a piston reciprocating therein and arranged for operative connection with an implement part adapted to be raised to transport position, a valve chamber, admission passages extending from said pump and communicating with said valve chamber, discharge passages communicating with said valve chamber and adapted to return the hydraulic liquid to said pump, cylinder passages extending from said valve chamber to opposite ends of said cylinder, and a valve reciprocable in said valve chamber comprising piston portions and intermediate valve transfer passages, said valve in its neutral position connecting one of said admission passages with one of said discharge passages through said valve chamber, said valve in one shifted position connecting one of said admission passages with one of said cylinder passages and connecting the other cylinder passage with one of said discharge passages, and said valve in its other shifted position connecting one of said admission passages with the other cylinder passage and connecting the opposite cylinder passage with one of said discharge passages.

22. The combination with a farm tractor including an engine, of a hydraulically actuated power lifting mechanism on the tractor comprising a hydraulic pump arranged to be driven from one of the engine driven parts of the tractor, a cylinder having a piston therein arranged to have lifting connection with an implement part associated with the tractor, a valve chamber, admission passages opening into said chamber at three longitudinally spaced points and adapted to conduct liquid under pressure from said pump to said valve chamber, discharge passages communicating with said valve chamber at the ends thereof and at a median point of said cylinder and adapted to return the liquid to said pump, cylinder passages extending from the left and right hand ends of said cylinder and opening into said valve chamber intermediate said admission passages and said end discharge passages, and a valve reciprocable in said chamber comprising two intermediate piston portions and two end piston portions spaced by intermediate and end valve transfer passages, said valve in its neutral position placing the intermediate admission port in communication with the intermediate discharge port through the intermediate transfer passage of the valve, with the end piston portions of the valve closing the cylinder passages for hydraulically locking said piston against movement, said valve in one shifted position placing one admission passage in communication with the left-hand cylinder passage and placing the right-hand cylinder passage in communication with one of the end discharge passages, and in another shifted position alternating this relation by placing one admission passage in communication with the right-hand cylinder passage and by placing the left-hand cylinder passage in communication with one of said discharge passages.

23. The combination with a farm tractor including an engine, of a hydraulically actuated power take-off mechanism on the tractor and deriving power continuously from the tractor engine regardless of whether the tractor be stationary or moving, and serving to actuate a movable member associated with the tractor, said mechanism enabling said movable member to be hydraulically locked against movement in either direction.

24. The combination with a tractor including an engine, of power take-off mechanism mounted on the tractor comprising housing portions defining a cylinder and a pumping chamber, a piston reciprocable in said cylinder, pumping means operating within said pumping chamber, means for driving said pumping means from the tractor engine, a liquid circulating system comprising passages for conducting a liquid from said pumping chamber to said cylinder and from said cylinder back to said pumping chamber, a liquid reservoir, and a check valve connection between said reservoir and said liquid circulating system whereby pressures in said system are incapable of being transmitted to said reservoir but said reservoir is capable of supplying replenishing liquid to said system.

25. The combination with a tractor including an engine, of power take-off mechanism on the tractor comprising a cylinder and a pump, a piston reciprocable in said cylinder, means for driving said pump from the tractor engine, a pressure passage for conducting liquid from said pump to said cylinder, a return passage for conducting the liquid back to said pump, valve means for controlling the flow of liquid from said pressure passage into said cylinder or back into said return passage, a liquid reservoir, a supply connection from said reservoir to said return passage, and a check valve in said supply connection for preventing pressure in said return passage from being transmitted to said reservoir but permitting said reservoir to suppy replenishing liquid to the pump and cylinder through said return passage.

26. The combination with an engine driven tractor and an implement adapted to be propelled thereby and comprising an implement part adapted to be shifted from one position to another; of power actuated shifting mechanism associated with the tractor and comprising a hydraulically actuated member movable under power derived from the engine of the tractor, operating connections between said member and said implement part for shifting the position of the latter with respect to the tractor, control means for hydraulically holding said movable member at any one of several points in the path of its movement for adjusting the operative position of said implement part, and means for automatically returning said control means to a neutral position after operation thereof.

27. In an agricultural implement, the combination with a tractor including an engine, of implement means comprising a soil working device connected adjacent to one end of the tractor, hydraulically actuated power take-off mechanism mounted on the tractor, deriving power from the engine thereof, and operatively connected with said soil working device for raising and lowering the latter between transport and operative positions and for hydraulically locking said device at different soil working depths, control means for said power take-off mechanism, and means for automatically returning said control means to a neutral position after operation thereof.

28. The combination with an engine driven tractor and an implement adapted to be propelled thereby and comprising an implement part adapted to be raised and lowered; of power lifting and adjusting mechanism associated with the tractor and comprising a hydraulically actuated member movable under power derived from the engine of the tractor, upwardly yielding operating connections between said member and said implement part for raising or lowering the latter, and control means for hydraulically holding said movable member at any one of several points in the path of its movement for adjusting the operative position of said implement part.

29. A farm implement comprising a wheel supported implement frame, an implement part mounted on said frame and adapted to be adjusted from one position to another, an engine mounted on said frame, and power actuated adjusting mechanism associated with said frame and comprising a hydraulically actuated member movable under power derived from said engine, operating connections between said member and said implement part for adjusting the position of the latter with respect to said frame, and control means for hydraulically holding said movable member at any one of several points in the path of its movement for adjusting the operative position of said implement part.

30. A farm implement comprising a wheel supported implement frame, an implement part associated with said frame and adapted to be moved to different positions in the operation of the implement, an engine mounted on said frame, and power actuated adjusting mechanism mounted on said frame and comprising a hydraulic pump driven from said engine, a cylinder member and a piston member therein, operating connections between one of said members and said implement part for transmitting movement to the latter, and means controlling the admission and discharge of the pumped liquid to and from said cylinder and being operative through said liquid to hydraulically lock the movable member at different points in the path of its movement whereby to adjust said implement part to different positions and to lock said implement part in the selected position.

31. An agricultural implement comprising a wheel supported implement frame, an implement part associated with said frame and adapted to be shifted from one position to another, an engine mounted on said frame, and power actuated shifting mechanism associated with said frame and comprising a hydraulically actuated member movable under power derived from said engine, operating connections between said member and said implement part for shifting the position of the latter with respect to said implement frame, control means for hydraulically holding said movable member at any one of several points in the path of its movement for adjusting the operative position of said implement part, and means for automatically returning said control means to a neutral position after operation thereof.

32. The combination with a tractor including a motor, of lifting mechanism for an implement associated with the tractor to be propelled thereby, comprising a rock shaft mounted on the tractor, an implement part operatively connected with said rock shaft to be moved thereby to different positions relatively to said rock shaft, and power lift mechanism driven by said motor and operable to rock said shaft to extreme and intermediate positions and to lock said shaft in either of said positions.

33. The combination with a tractor including a motor, of lifting mechanism for an implement associated with the tractor to be propelled thereby, comprising a rock shaft and hydraulically operating power lift mechanism driven by said motor and operable to rock said shaft to different positions and to lock said shaft in said different positions.

34. The combination with a tractor including a motor, of a plurality of implement tools associated with the tractor to be propelled thereby, and adjusting mechanism for said tools comprising a rock shaft, motion transmitting connections between said rock shaft and said implement tools for shifting the positions of the latter with motion of said shaft, said connections including separately operable adjusting devices for independently adjusting said implement tools, and power actuated mechanism driven by said motor and operable to rock said shaft to extreme and intermediate positions and to lock said shaft in either of said positions.

35. The combination with a tractor including a motor, of an implement device associated with the tractor and adapted to be shifted to different positions, and power actuated mechanism for shifting said implement device comprising a rock shaft mounted on the tractor adjacent to the rear thereof, means operatively connecting said rock shaft with said implement device for moving the latter to different positions relatively to said rock shaft, and power driven means driven by said motor and operable to rock said shaft by power to different positions in either direction of movement and to lock said shaft in either of said positions.

36. The combination with a tractor including an engine, a power take-off mechanism mounted on the tractor comprising housing portions defining a cylinder, a valve chamber, and a reservoir chamber, a piston reciprocating in said cylinder, a liquid circulating system comprising passages cored in said housing portions and connecting said valve chamber with said cylinder and said reservoir chamber, a pump, connections between said pump and said reservoir chamber and said valve chamber whereby said pump may draw liquid from said reservoir chamber and conduct it under pressure to said valve chamber, and a valve in said valve chamber for alternatively directing the liquid from the valve chamber into said cylinder or into said reservoir chamber.

37. The combination with a tractor including an engine, of a power take-off unit comprising a casing having a rotating power take-off shaft mounted therein, means for mounting said casing on the tractor, means for operatively connecting said shaft with one of the engine driven parts of the tractor, hydraulically actuated power take-off mechanism comprising a cylinder and a piston, a reservoir chamber, a hydraulic pump comprising two cooperating pumping gears one of which is mounted on said rotary power take-off shaft, and a valve for alternatively directing the liquid from said pump into said cylinder or into said reservoir chamber.

38. The combination with a tractor including an engine, of power take-off mechanism mounted on the tractor comprising a housing defining a cylinder, a reservoir chamber and a valve chamber, a piston reciprocating in said cylinder, a valve movably mounted in said valve chamber, a liquid circulating piston comprising passages cored in said housing and connecting said valve chamber, said cylinder and said reservoir chamber, a liquid pump operatively connected with said liquid circulating piston, means for driving said pump from the tractor engine, and means for actuating said valve.

39. The combination with a tractor including an engine, of power take-off mechanism mounted on the tractor comprising a housing defining a cylinder and a liquid reservoir chamber, a piston reciprocating in said cylinder, a liquid circulating system comprising passages cored in said housing and connecting said cylinder with said reservoir chamber, a liquid pump operatively connected with said liquid circulating system, means for driving said pump from the tractor engine, and means for locking said piston in one position.

40. The combination with a tractor including an engine, of power take-off mechanism mounted on the tractor comprising housing portions defining a cylinder, a valve chamber, and a reservoir chamber, a piston reciprocating in said cylinder, a liquid circulating system comprising passages cored in said housing portions and connecting said valve chamber with said cylinder and said reservoir chamber, a pump, connections between said pump and said reservoir chamber and said valve chamber whereby said pump may draw liquid from said reservoir chamber and conduct it under pressure to said valve chamber, a valve in said valve chamber for alternatively directing the liquid from the valve chamber into said cylinder or into said reservoir chamber, and a pressure relief valve associated with said circulating system for limiting the maximum force which can be exerted by said piston.

HAROLD BROWN.